United States Patent [19]

Edwards et al.

[11] Patent Number: 4,690,551
[45] Date of Patent: Sep. 1, 1987

[54] LASER RADAR UTILIZING PULSE-TONE WAVEFORM

[75] Inventors: Brian E. Edwards, Sterling; David G. Biron, Westford, both of Mass.

[73] Assignee: Massachusetts Institute of Technology, Cambridge, Mass.

[21] Appl. No.: 725,243

[22] Filed: Apr. 19, 1985

[51] Int. Cl.$^4$ ........................................... G03G 15/00
[52] U.S. Cl. ........................................... 356/5; 356/28
[58] Field of Search ........................... 356/5, 28, 28.5; 332/7.51

[56] References Cited

U.S. PATENT DOCUMENTS

| | | | |
|---|---|---|---|
| 4,190,361 | 2/1980 | Dubrunfaut | 356/28 |
| 4,298,280 | 11/1981 | Harney | 356/5 |
| 4,447,149 | 5/1984 | Marcus et al. | 356/28.5 |
| 4,466,738 | 8/1984 | Huang et al. | 356/28.5 |
| 4,537,502 | 8/1985 | Miller et al. | 356/5 |

Primary Examiner—Michael L. Gellner
Assistant Examiner—David M. Gray

[57] ABSTRACT

Pulse-tone laser radar utilizing an acousto-optic angular multiplexer and frequency shifter. The laser radar includes both a pulsed laser and a CW laser. A portion of the CW laser beam is utilized as a reference or local oscillator. An acousto-optic angular multiplexer passes the output of the pulsed laser when the acousto-optic multiplexer is in its off state and passes and frequency shifts the output of the CW laser when the acousto-optic multiplexer is in its on state. The acousto-optic angular multiplexer is operated to pass a pulse followed by a CW tail to generate the pulse-tone waveform. The return signal from a target is beat together with the local oscillator signal derived from the CW laser. The resulting beat signal includes both range and velocity information.

6 Claims, 4 Drawing Figures

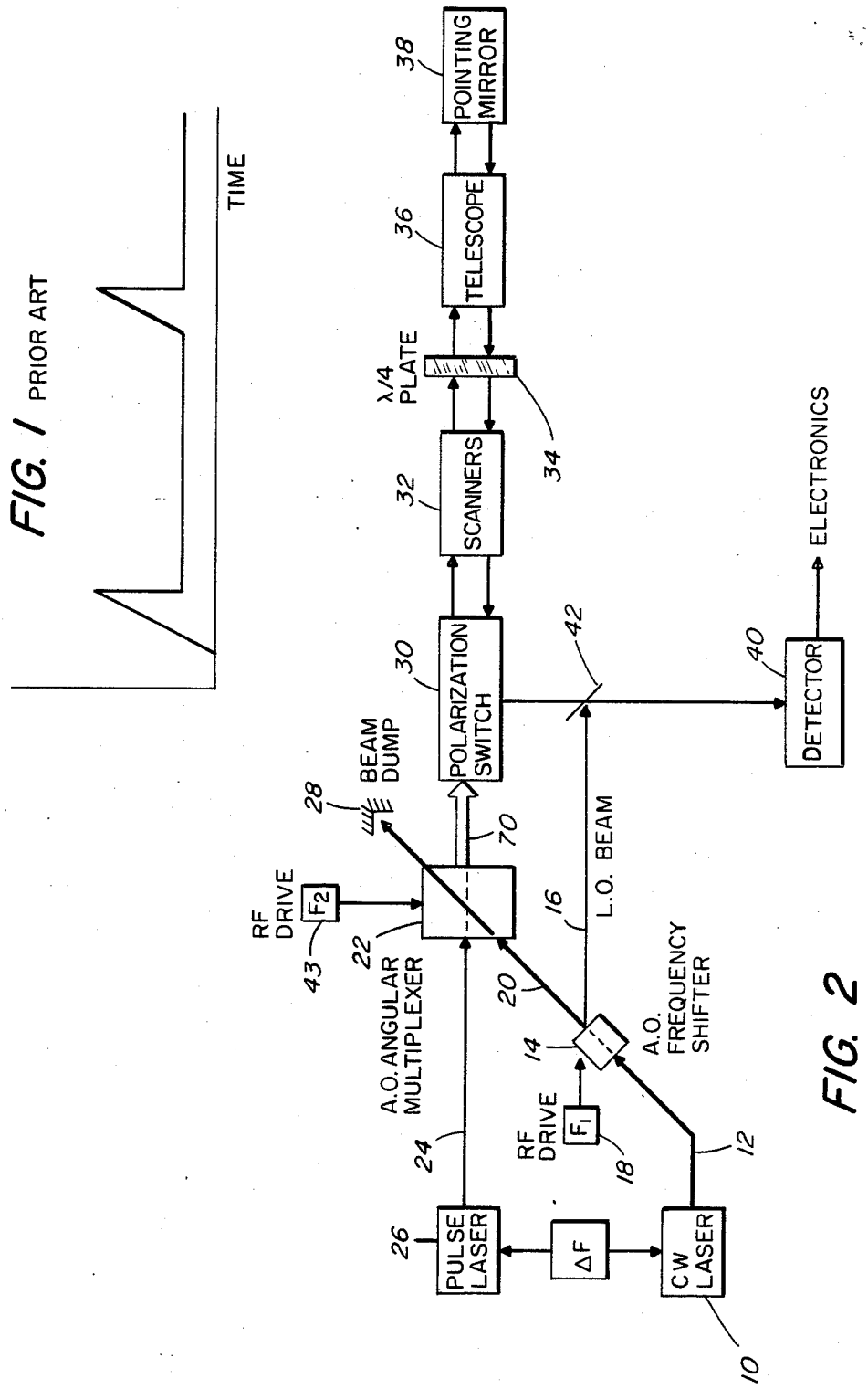

4,690,551

LASER RADAR UTILIZING PULSE-TONE WAVEFORM

BACKGROUND OF THE INVENTION

The Government has rights in this invention pursuant to Contract No. F19628-80-C-0002 awarded by the Department of the Air Force.

BACKGROUND OF THE INVENTION

The present invention relates to laser radars and more particularly to a laser radar employing a pulse-tone waveform for determining both range and velocity of a target.

Laser radars operate by launching a beam of laser light toward a target and receiving the return signal. Range can be determined by the time of flight of a pulse from the laser until detection of the return signal by a receiver. Range accuracy depends on the narrowness of the pulse so that a pulse having a very short duration will result in the highest range accuracy. On the other hand, the determination of target velocity is most readily accomplished with a laser generating a CW output. Such an output may be thought of as a tone signal because of its substantially constant amplitude. The frequency shift of such a tone is directly related to the target velocity. The utility of a waveform including both a pulse and a tone portion has been described in U.S. Pat. No. 4,298,280. Such a prior art waveform is illustrated in FIG. 1. The time of flight of the pulse portion of the pulse-tone waveform is used to determine range, and the frequency shift in the tone portion of the pulse-tone waveform is an indication of target velocity.

Though useful, the prior art pulse-tone waveform is difficult, if not impossible, to generate with a single laser. One reason for the difficulty is that a laser must be turned off to permit sufficient energy storage to generate a narrow or Q-switched pulse. During this time, the CW or tone portion may not be generated.

It is therefore an object of this invention to provide laser radar apparatus which generates and utilizes a pulse-tone waveform.

A further object of the invention is such laser radar which does not require a separate local oscillator laser.

Yet another object of the invention is laser radar apparatus capable of use in either a pulsed, CW or pulse-tone mode.

SUMMARY OF THE INVENTION

These and other objects and advantages of the invention are achieved in a laser radar including both a CW and a pulsed laser. Optical apparatus is provided to derive a local oscillator beam from the CW laser. An acousto-optic angular multiplexer passes the output of the pulsed laser when the multiplexer is in its off state and passes and frequency shifts the output of the CW laser when the multiplexer is in the on state to generate the pulse-tone waveform. The laser radar further includes optics for launching the pulse-tone waveform toward a target and for receiving a return waveform. A receiver is provided whose input is the return waveform and the local oscillator beam. These signals beat together to generate an intermediate frequency (IF) signal including both target range and velocity information. The output through the multiplexer may be interchanged as to whether the pulse or the tone goes through when it is off or on by interchanging the optical path through the multiplexer.

In one embodiment of the invention, an acousto-optic frequency shifter is provided for deriving the local oscillator beam. Alternatively, a partially reflecting mirror can be used. The acousto-optic angular multiplexer has the desirable characteristic of not only deflecting the beam from the CW laser, but also frequency shifting the beam so that the beat frequencies generated by the pulse and tone portions of the pulse-tone waveform will be different to facilitate extracting the range and velocity information.

BRIEF DESCRIPTION OF THE DRAWING

The invention disclosed herein will be understood better with reference to the drawing of which:

FIG. 1 is a graph showing a prior art pulse-tone waveform;

FIG. 2 is a schematic diagram of the invention disclosed herein;

DESCRIPTION OF THE PREFERRED EMBODIMENT

Figure 3:
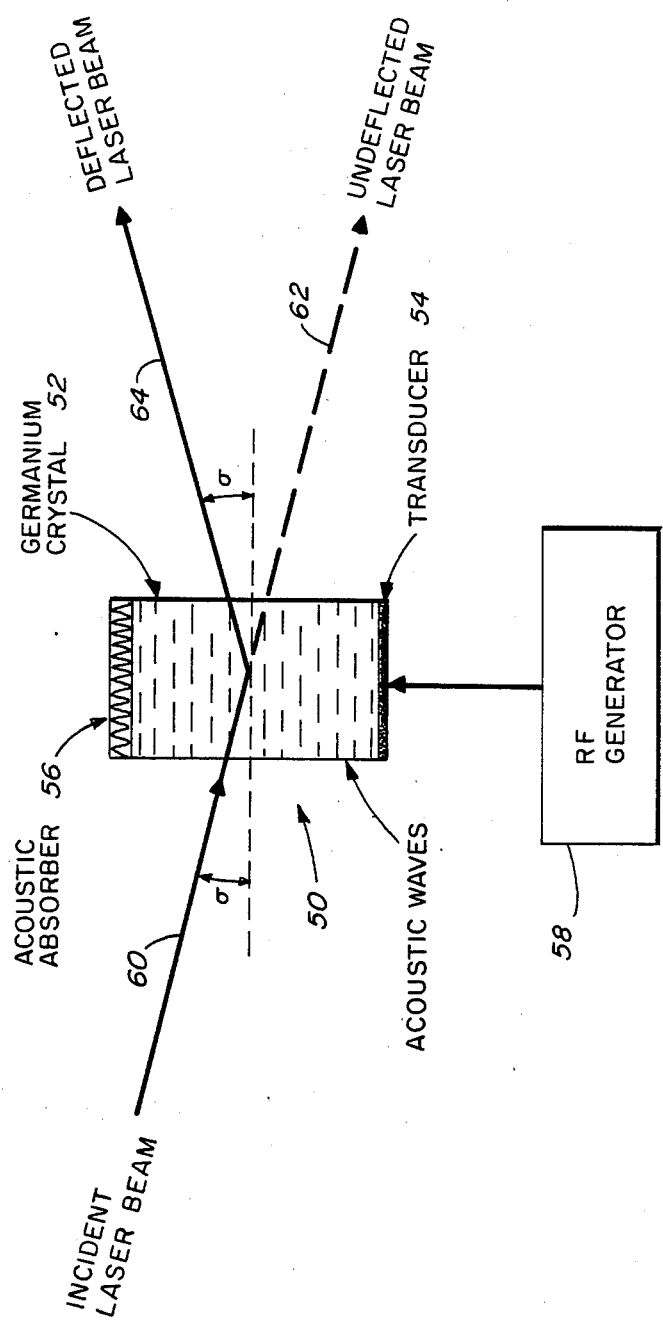
FIG. 3 is a schematic diagram of the acousto-optic multiplexer utilized in the present invention.

As discussed above, it is desirable to create a waveform such as the known waveform illustrated in FIG. 1. This waveform is known as a pulse-tone waveform. The range to a target is determined using time of flight of the short pulse portion and velocity is determined by frequency shift of the long CW "tail" or tone portion of the pulse. The invention disclosed herein for generating a pulse-tone waveform will now be discussed with reference to FIG. 2. A CW laser 10 generates a CW beam 12 which passes through an acousto-optic frequency shifter 14. As will be discussed in more detail with reference to FIG. 3, the acousto-optic frequency shifter 14 will deflect and frequency shift a portion of the beam 12 creating a beam 16 which serves as the local oscillator reference beam. The acousto-optic frequency shifter 14 is controlled by an RF drive 18 operating at a frequency F1. The major portion of the beam 12 passes through the acousto-optic frequency shifter 14 undeflected along the path 20. The ratio of the power in the beams 16 and 20 is controlled by the power of the RF drive 18.

An important aspect of this invention is an acousto-optic angular multiplexer 22. Both the CW beam 20 and a beam 24 from a pulsed laser 26 impinge upon the acousto-optic angular multiplexer 22. When the acousto-optic angular multiplexer 22 is off, both beams 20 and 24 pass through undeflected and with no frequency shifting. With the acousto-optic angular multiplexer 22 off, the beam 20 will pass through into a beam dump 28. The beam 24 will pass undeflected through the acousto-optic angular multiplexer 22 and pass through further optics for launch of the beam toward a target (not shown). In particular, the beam passes through a polarization switch 30, scanners 32, λ/4 plate 34, telescope 36, and pointing mirror 38. The return signal passes through these same elements and is directed onto a detector 40. The local oscillator beam 16 is also directed onto the detector 40 through a partially reflecting mirror 42. The acousto-optic angular multiplexer 22 is controlled by a second RF drive 43 which operates at a frequency F2.

FIG. 3 illustrates, by way of example, an acousto-optic frequency shifter and angular multiplexer utilized in the present invention. An acousto-optic multiplexer or frequency shifter 50 includes a germanium crystal 52 on the lower portion of which is affixed a transducer 54, and on the upper portion of which is an acoustic absorber 56. An RF generator 58 drives the transducer 54 to launch acoustic waves through the germanium crystal 52. When the RF generator 58 is off, an incident laser beam 60 will pass directly through the germanium crystal 52 as shown by the dotted beam 62. When acoustic waves are propagating through the germanium crystal 52, the incident laser beam 60 will be deflected along a path 64. This effect is particularly efficient when the angle of incidence $\sigma$ is the so-called Bragg angle. Not only is the incident laser beam 60 deflected along the path 64, but its frequency is shifted by the amount of the frequency of the acoustic waves propagating in the germanium crystal 52. By controlling the amounts of RF drive 58, the ratio of the incident beam 60 which is defelected (64) to that of the undeflected beam (54) may be altered between 0 and 0.9.

The operation of the pulse-tone laser radar of FIG. 2 will now be discussed. To generate the waveform of FIG. 1, the pulsed laser 26 is operated to generate a narrow pulse. During the period of the pulse, the acousto-optic angular multiplexer is maintained in its off state. Therefore, the beam 24 from the pulsed laser 26 will pass straight through the acousto-optic angular multiplexer 22 and pass through the further optics to be launched toward a target. Since the acousto-optic angular multiplexer 22 is off, the beam 20 from the CW laser 10 will pass undeflected through the multiplexer 22 into the beam dump 28. Thus, during the period of the narrow pulse, only the pulse is launched toward a target. At the end of the pulse, the acousto-optic angular multiplexer 22 is turned on. Now the beam from the CW laser 20 will be deflected along the path 70 and will continue through the optics to be launched toward the target. The RF drive 42 will be maintained on until it is time to generate the next pulse portion of the pulse-tone waveform. The cycle is then repeated to generate the repeating pulse-tone waveform.

Figure 4:
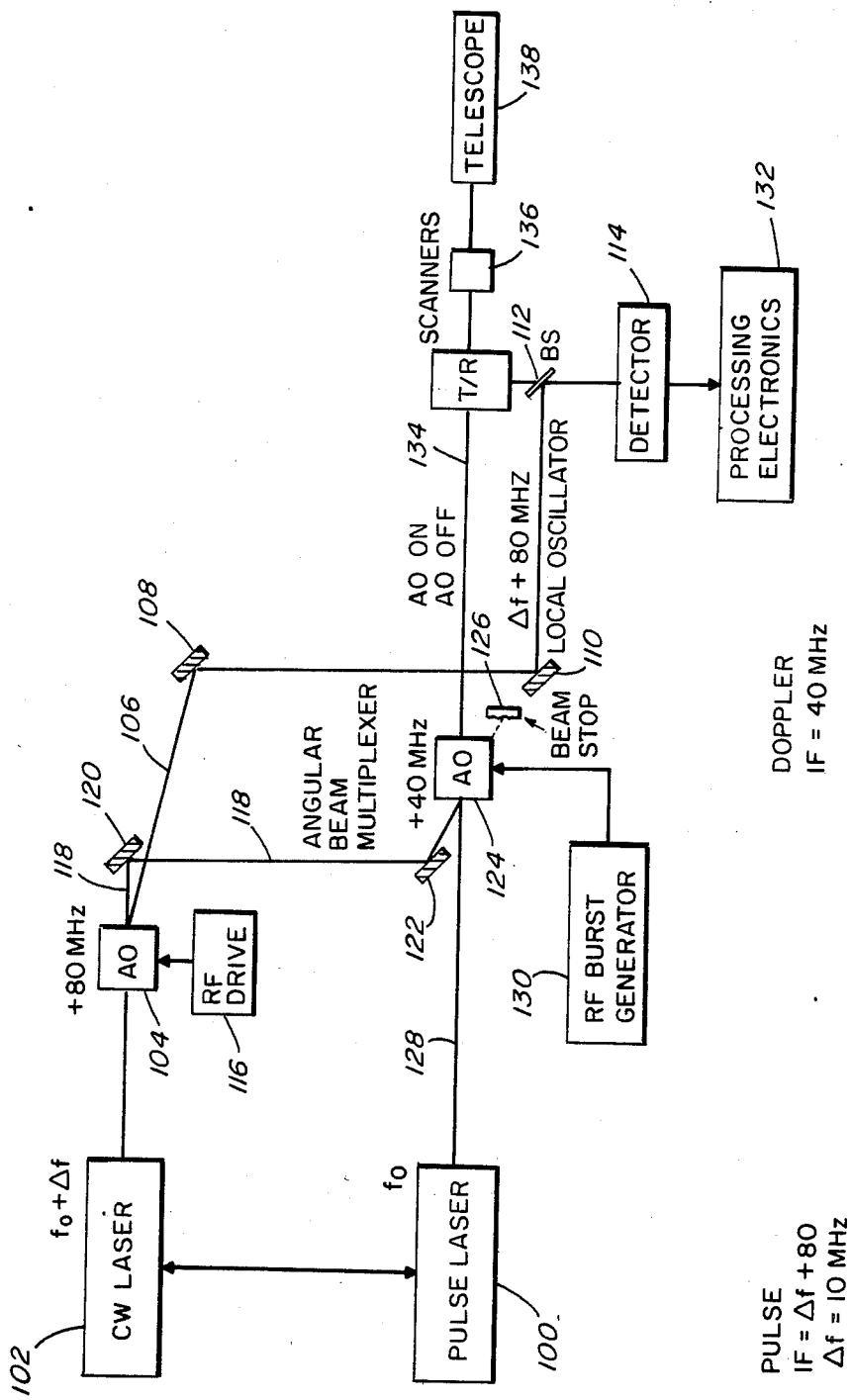
FIG. 4 is a more detailed schematic diagram of the present invention.

A specific configuration of the present invention will now he discussed with reference to FIG. 4. In this case, a pulse laser 100 is operated at a frequency $F_0$ and a CW laser 102 operates at a frequency of $F0 + \Delta F$ where $\Delta F$ is an arbitrary frequency offset. A suitable value for $\Delta F$ is 10 MHz. The light energy from the CW laser 102 passes through an acousto-optic frequency shifter 104 which frequency shifts the deflected beam 106 by 80 MHz. The beam 106 which serves as the local oscillator beam is reflected by mirrors 108, 110 and 112 onto a detector 114. The power of an RF drive 116 can be adjusted to maintain the local oscillator beam 106 at an optimum level for detector performance. The main portion 118 of the output of the acousto-optic device 104 is reflected by mirrors 120 and 122 to impinge at the Bragg angle onto an acousto-optic angular multiplexer 124. As in FIG. 2, the beam 118 will pass undeflected through the acousto-optic angular multiplexer 124 when the multiplexer is off and will be stopped by a beam stop 126. An output beam 128 from the pulse laser 100 at a frequency of $F_0$ also impinges on the acousto-optic angular multiplexer 124. The multiplexer 124 is controlled by an RF burst generator 130. During the pulse phase, the return pulse signal at the frequency $F_0$ is beat together with the local oscillator signal at a frequency $F_{0+}\Delta F + 80$ MHz. If $\Delta F$ is 10 MHz, then the beat or intermediate frequency will be centered about 90 MHz. Processing electronics 132 includes a band pass filter operating at this intermediate frequency and can be utilized to extract range information. At the conclusion of the pulse from the pulse laser 100, the acousto-optic angular multiplexer 124 is turned on and the beam 118 is deflected to pass along the path 134 to be launched toward a target through scanners 136 and a telescope 138. As discussed above, not only is the beam 118 deflected along the path 134 by the multiplexer 124, but its frequency is also shifted by the frequency of the RF burst generator 130. A suitable frequency shift is 40 MHz. The beam 134 having a frequency of $F_0 + \Delta F + 40$ MHz is beat against the local oscillator signal at a frequency of $F_0 + \Delta F + 80$ MHz resulting in an intermediate or beat frequency centered about 40 MHz. The processing electronics 132 includes a second band pass filter centered around 40 MHz to select out the velocity information from the "tone" portion of the waveform. Thus, in the above example, range information is contained in a 90 MHz intermediate frequency signal and velocity information is contained in the 40 MHz intermediate frequency signal.

The acousto-optic angular multiplexer 124 has the desirable characteristics of not only deflecting the beam, but also shifting the frequency. In this way, velocity and range information are included in frequency separated intermediate frequencies. Note that the present invention also eliminates the need for a separate local oscillator laser since the CW laser is used both to generate the CW or tone portion of the pulse-tone waveform and also to provide a local oscillator signal. By proper choice of acoustic drive frequencies $F_1$ and $F_2$ both lasers may be operated near frequency line center, thus producing maximum output power efficiency.

It is thus seen that the objects of this invention have been achieved in that there has been disclosed laser radar apparatus which readily generates the desired pulse-tone waveform for making range and velocity measurements. The present invention makes use of both the deflection and frequency shifting characteristics of acousto-optic devices. It is recognized that modifications and variations of the present invention will occur to those skilled in the art and it is intended that all such modifications and variations be included within the scope of the appended claims.

What is claimed is:
1. Laser radar comprising:
   (1) A CW laser;
   (2) A pulsed laser;
   (3) Means for deriving a local oscillator beam from the CW laser;
   (4) Acousto-optic angular multiplexer means for passing the output of the pulse laser when the multiplexer is in the off state and for passing and frequency shifting the output of the CW laser when the multiplexer is in the on state to generate a pulse-tone waveform;
   (5) Optical means for launching the pulse-tone waveform toward a target and for receiving a return waveform;
   (6) A detector; and
   (7) Means for simultaneously directing the return waveform and the local oscillator beam onto the detector to generate a beat signal including both target range and velocity information.

2. The laser radar of claim 1 wherein said means for deriving a local oscillator beam is an acousto-optic frequency shifter.

3. The laser radar of claim 1 wherein said means for deriving a local oscillator beam is a partially reflecting mirror.

4. The laser radar of claim 2 wherein the pulsed laser and CW laser operate at a fixed frequency offset of $\Delta F$, the acousto-optic frequency shifter operates at a frequency F1, and the acousto-optic angular multiplexer operates at a frequency F2.

5. The laser radar of claim 4 wherein $\Delta F$ is 0.

6. Pulse-tone waveform generator comprising:
(1) A CW laser;
(2) A pulsed laser;
(3) Means for deriving a local oscillator beam from the CW laser;
(4) Acousto-optic angular multiplexer; and
(5) Means for operating the acousto-optic multiplexer in the off state to pass the pulse output of the pulsed laser and for operating the acousto-optic multiplexer thereafter in the on state to pass and frequency shift the tone output of the CW laser.

* * * * *